July 29, 1952 W. H. CUTTINO 2,605,456
REGULATING SYSTEM
Filed Oct. 9, 1950
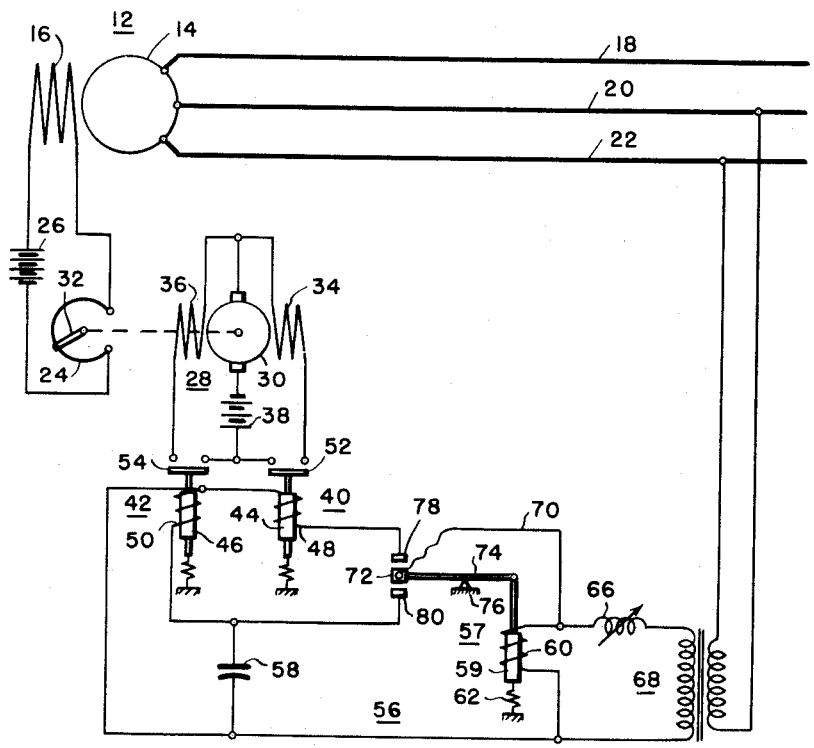
WITNESSES:
E. A. McCloskey
K. W. Thomas
INVENTOR
William H. Cuttino.
BY
James K. Ely
ATTORNEY Patented July 29, 1952

2,605,456

UNITED STATES PATENT OFFICE 2,605,456

REGULATING SYSTEM

William H. Cuttino, Pittsburgh, Pa., assignor to Westinghouse Electric Corporation, East Pittsburgh, Pa., a corporation of Pennsylvania Application October 9, 1950, Serial No. 189,259

4 Claims. (Cl. 322—28)

This invention relates to relay circuits and particularly to relay circuits used in maintaining the output voltage of a generator constant.

It is desirable to provide a voltage-regulating relay in which there is a proper amount of compounding and a positive make and break of the relay contact members. Compounding is defined as the change in the relay input voltage required to actuate a relay contact member to a circuit interrupting position from a circuit closing position. Unless the relay is provided with the proper amount of compounding, the movable arm or beam of the relay which carries the movable contact member oscillates into and out of circuit closing positions to cause hunting in the operation of the system controlled by the relay. Not only is the operation of the system affected, but in addition, the life of the contact members is considerably shortened due to the arcing that is present when there is no positive make and break of the relay contact members.

Heretofore in a voltage-regulating relay, in order to secure the proper amount of compounding, it was necessary to provide compounding coils for each set of relay contact members. These compounding coils, when energized, held the relay contact members in a circuit closing position. The coils were energized the moment the contact members were actuated into engagement and remained energized for a period of time, depending on the time, that it took for the input voltage to the voltage-regulating relay to increase or decrease a predetermined amount. Thus, several such compounding coils had to be provided in addition to the main relay operating coil which meant a considerable increase in the size and cost of manufacturing the voltage relay.

An object of this invention is to provide a voltage-regulating relay having a positive making and breaking operation of the relay contact members.

Another object of this invention is the provision of a voltage-regulating relay utilizing a single coil for energizing the relay and for securing compounding.

A still further object of this invention is to provide for varying the number of ampere turns in the energizing coil of a voltage-regulating relay to effect compounding and a positive make and break of the relay contact members.

Other objects of this invention will become apparent from the following description when taken in conjunction with the accompanying drawing, the single figure of which is a diagrammatic representation of apparatus and circuits illustrating an embodiment of this invention.

Referring to the drawing, this invention is illustrated as utilized in a regulating system for a three-phase dynamoelectric machine 12 having an armature winding 14 and a field winding 16, it being understood that this invention can be applied to other types of regulating systems, such as systems for regulating line voltage in which an induction regulator or capacitor switching is utilized. The dynamoelectric machine 12 is connected to supply a load circuit represented by the conductors 18, 20 and 22. The excitation of the field winding 16 is controlled by adjusting the setting of a variable rheostat 24 which is connected in series circuit with a battery 26 and the field winding 16.

In the embodiment illustrated, the rheostat 24 is adjusted by controlling the operation of a motor 28. The motor 28 is provided with an armature 30 which is mechanically connected to operate the movable contact member 32 of the rheostat 24 to either shunt or connect additional sections of the rheostat 24 in the field winding circuit, depending upon the direction of rotation of the motor 28. The motor 28 is provided with two field windings 34 and 36 which, when selectively energized from a battery 38, determine the direction of rotation of the motor 28.

In order to selectively control the energization of the windings 34 and 36, relays 40 and 42 are provided for completing the circuits from the battery 38 to the field windings 34 and 36 respectively. The relays 40 and 42 comprise movable armature members 44 and 46, respectively, operating coils 48 and 50, respectively, wound or disposed about the movable armature members 44 and 46, and contact members 52 and 54.

In order to selectively control the energization of the operating coils 48 and 50 of the relays 40 and 42, respectively, a relay circuit 56 embodying the teachings of this invention is provided. As illustrated, the relay circuit 56 comprises a voltage-regulating relay 57, a capacitor 58 and an inductance element, which in the particular embodiment shown constitutes the operating coil 48 of the relay 40. However, it is to be understood that an inductance element such as a reactor or a resistor may be inserted in series with the operating coil 48 if the coil 48 does not provide sufficient inductane. And if a different circuit than that shown is used the inductance element may constitute a separate element in the circuit. The purpose of the capacitor 58 and the inductance element 48 will be described hereinafter.

The relay 57 comprises a movable armature member 59, a winding or operating coil 60 disposed about the core of the armature member 59 and a spring biasing member 62 which opposes the magnetic pull effected by the energization of the operating coil 60. A variable inductance element 66, the purpose of which will hereinafter be described, is connected to the operating coil 60 and to the secondary winding of a voltage transformer 68, the primary winding of the transformer 68 being connected to the conductors 20 and 22. A circuit 70 is also provided for connecting one end of the operating coil 60 to a movable contact member 72 of the relay 57. The movable contact member 72 is carried by one end of a pivotally movable arm or beam 74, the other end of the beam 74 being mechanically connected to the movable armature member 59. The beam 74 is so disposed that it can selectively actuate the movable contact 72 into engagement with either of opposed stationary contact members 78 and 80.

An inductance element (in the specific embodiment illustrated in the drawing the operating coil 48) is connected between the stationary contact member 78 and one end of the operating coil 60. The inductance element 48 causes a lagging current, the purpose of which will hereinafter be described, to be drawn through the variable inductance element 66 when the movable contact member 72 and the stationary contact member 78 are in circuit closing position. Thus, in the specific embodiment illustrated the operating coil 48 serves a dual purpose. It provides the necessary inductance to effect a lagging current to be drawn through the variable inductance element 66, and it serves as the operating coil for the relay 40.

In order that a leading current, the purpose of which will hereinafter be described, may be drawn through the variable inductance element 66 when the movable contact member 72 and the stationary contact member 80 are in circuit closing position, the capacitor 58 is connected between the stationary contact member 80 and one end of the operating coil 60. A circuit is likewise provided for connecting one end of the operating coil 50 of the relay 42 to the stationary contact member 80 and the other end of coil 50 to an end of the operating coil 60 so that when contact members 72 and 80 are in engagement the winding 50 is energized to actuate the contact member 54 to a circuit closing position.

In systems of the type described, it is desirable to provide for maintaining the relay 57 in a balanced or neutral position for slight changes from the regulated magnitude. These slight changes usually constitute a relatively narrow band of voltage, such as up to one or two volts increase or decrease from the regulated magnitude.

In operation, with the dynamoelectric machine 12 being driven by any suitable prime mover (not shown), a predetermined voltage exists across the conductors 18, 20 and 22 and assuming that the voltage across conductors 20 and 22 is equal to the regulated magnitude, the regulating system is in the balanced condition shown.

If the voltage across conductors 20 and 22 should increase a predetermined amount from the regulated magnitude, a measure of the increase in voltage will appear across the operating coil 60, increasing the magnetic pull on the movable armature member 59. The movable armature member 59 will then actuate the movable contact member 72 into circuit closing position with the stationary contact member 80, thus completing a circuit to the operating coil 50. Once the operating coil 50 is energized the movable armature member 46 actuates the contact member 54 to the circuit closing position. This completes the circuit through the field winding 36 of the motor 28 to the battery 38 to effect an operation of the motor so as to rotate the contact member 32 of the rheostat in a direction to connect additional sections of the rheostat 26 in the field winding circuit whereby the excitation of the field winding 16 is so decreased as to effect a decrease in the voltage output of the dynamoelectric machine 12 to the regulated value.

As hereinbefore mentioned, the capacitor 58 is provided in order that a leading current may be drawn through the variable inductance element 66 when the output voltage of the dynamoelectric machine 12 rises a predetermined amount above the regulated value, and the contact member 72 is in engagement with the contact member 80. When a leading current is drawn through the variable inductance element 66, the voltage drop across the variable inductance element 66 is less than when the relay 57 is in its neutral position as shown in the drawing. As can be seen from the drawing, once the voltage drop has decreased across the variable inductance element 66, the voltage will be increased across the operating coil 60, thus increasing the number of ampere turns on the operating coil 60. The increased number of ampere turns on the operating coil 60 effects an increase in the magnetic pull on the movable armature member 59, thus tending to pivot the movable beam 74 further about the fulcrum 76 than would have been the case had no capacitor 58 been provided. This increase in the force applied to the movable beam 74 brought about by the presence of the capacitor 58 effects a greater contact pressure between the contact members 72 and 80. With an increase in contact pressure between the contact members 72 and 80 due to a leading current being drawn through the variable inductance element 66, there must be a predetermined decrease in the magnitude of the voltage across conductors 20 and 22 from the regulated value before the contact member 72 is returned to circuit interrupting position. In other words, this decrease in voltage across conductors 20 and 22 must be of such magnitude as to offset the added voltage drop across the operating coil 60 caused by the presence of the capacitor 58 in the relay circuit 55 when the contact members 72 and 80 are in circuit closing position. This predetermined decrease in the magnitude of the voltage across the conductors 20 and 22 represents the magnitude of the compounding as regards contact members 72 and 80. The desired amount of compounding can be obtained by adjusting the variable inductance element 66.

If, on the other hand, the voltage change across the conductors 20 and 22 is a decrease from the regulated magnitude outside the limits of the operating band, there will be a decrease of voltage across the operating coil 60. This decrease in voltage will decrease the magnetic pull on the movable armature member 59 and with the aid of the spring biasing member 62, the relay beam 74 will be pivoted about the fulcrum 76, thus actuating the contact member 72 into engagement with contact member 78. When the contact member 72 engages contact member 78, an energizing circuit is completed to the operating coil 48 of the relay 40. On energization of the operating coil 48 the contact member 52 of relay 40 is actuated to the circuit closing position to establish an energizing circuit for the field winding 34 of the motor 28. The energization of the winding 34 effects an operation of the motor 28 to actuate the contact member 32 of the field rheostat 24 in a direction to shunt additional sections of the rheostat 24. The shunting of the sections of the field rheostat 24 effectively increases the excitation of the field winding 16, whereby the voltage of the dynamoelectric machine 12 is increased to its regulated value.

As hereinbefore mentioned, the presence of the inductance element 48 causes a lagging current to be drawn through the variable inductance element 66 when the contact members 72 and 78 are in circuit closing position. The lagging current effects an increase in voltage drop across the variable inductance element 66 to thereby effect a decrease in the voltage drop across the operating coil 60. The decrease in voltage drop across coil 60 decreases the number of ampere turns on the operating coil 60 thus reducing the magnetic pull on the movable armature member 59. The reduced magnetic pull tends to permit the relay beam 74 to pivot, with the aid of the spring biasing member 62, further about the fulcrum 76 than would be the case if the inductance element 48 were to be omitted. This increased resultant force applied to the movable beam member 74 by the spring biasing member 62 and the operating coil 60 increases the contact pressure between the contact members 72 and 78. With an increase in contact pressure between the contact members 72 and 78 due to a lagging current being drawn through the variable inductance element 66, after the voltage across conductors 20 and 22 is increased to its regulated value, there must be a further predetermined increase in the magnitude of the voltage across the conductors 20 and 22 from the regulated value before the winding 60 is sufficiently energized to actuate the contact member 72 to its circuit interrupting position. This predetermined increase in the magnitude of the voltage across the conductors 20 and 22 represents the magnitude of the compounding as regards contact members 72 and 78. As hereinbefore referred to, the desired amount of compounding can be obtained by adjusting the variable inductance element 66.

Thus it can be readily seen that the relay circuit 56 embodying the teachings of this invention provides the proper amount of compounding for the relay contact members 72, 78 and 80, and also provides a positive make and break of the relay contact members 72, 78 and 80 at a minimum of cost, eliminating elements previously required to obtain like results.

I claim as my invention:

1. In a relay circuit used in initiating means for decreasing the magnitude of a variable electrical quantity to maintain the magnitude of the quantity below a predetermined value, the combination comprising, an operating coil, an input circuit responsive to an increase in the magnitude of the electrical quantity from the predetermined value and including an inductance element connected to the operating coil, a series circuit connected in parallel circuit relation with the operating coil and comprising a set of contact members disposed for engagement in response to the energization of the operating coil for initiating said means to decrease the magnitude of the variable quantity and a capacitor element for effecting a leading current to be drawn through the inductance element in the input circuit to the operating coil, the leading current effecting an increase in the energization of the operating coil to increase the contact pressure of the contact members.

2. In a relay circuit used in initiating means for selectively increasing and decreasing the magnitude of a variable electrical quantity to maintain the magnitude of the quantity substantially constant, the combination comprising, an operating coil, an input circuit responsive to the voltage output of said means and including an inductance element connected to the operating coil, a series circuit connected in parallel circuit relation with the operating coil and comprising a set of contact members disposed for engagement in response to the energization of the operating coil for initiating said means to increase the magnitude of the variable quantity and an inductance element for effecting a lagging current to be drawn through the inductance element in the input circuit to the operating coil, the lagging current effecting a decrease in the energization of the operating coil to increase the contact pressure of the contact members, and a series circuit connected in parallel circuit relation with the operating coil and comprising a second set of contact members disposed for engagement in response to the energization of the operating coil for initiating said means to decrease the magnitude of the variable quantity and a capacitor element for effecting a leading current to be drawn through the inductance element in the input circuit to the operating coil, the leading current effecting an increase in the energization of the opertaing coil to increase the contact pressure of the second set of contact members.

3. In a relay circuit used in initiating means for regulating the magnitude of a variable quantity to maintain the quantity at a substantially constant value, the combination comprising, an operating coil, an input circuit responsive to deviations of the electrical quantity from the predetermined value and comprising an inductance element connected to the operating coil, a pair of opposed stationary contact members, a movable contact member disposed to be actuated into selective engagement with the opposed contact members, a capacitor connected between one end of the operating coil and one of the stationary contact members, and another inductance element connected between the other stationary contact member and the one end of the operating coil, and means responsive to the energization of the operating coil disposed to actuate the movable contact member into engagement with the opposed contact members to selectively connect the capacitor and said another inductance element in parallel circuit relation with the operating coil.

4. In a system for regulating the magnitude of a variable electrical quantity to maintain the quantity at a substantially predetermined value, the combination comprising, means for regulating the magnitude of the variable quantity, and a relay circuit for initiating said means comprising, an operating coil, an input circuit responsive to deviations of the electrical quantity from the predetermined value and comprising an inductance element connected to the operating coil, a pair of opposed stationary contact members, a movable contact member disposed to be actuated into selective engagement with the opposed contact members, a capacitor connected between one end of the operating coil and one of the stationary contact members, and another inductance element connected between the other stationary contact member and the one end of the operating coil, and means responsive to the energization of the operating coil disposed to actuate the movable contact member into engagement with the opposed contact members to selectively connect the capacitor and said another inductance element in parallel circuit relation with the operating coil.

WILLIAM H. CUTTINO.

REFERENCES CITED

The following references are of record in the file of this patent:

UNITED STATES PATENTS

| Number | Name | Date |
|---|---|---|
| 1,470,681 | Boddie | Oct. 16, 1923 |
| 1,486,861 | Boddie | Mar. 18, 1924 |
| 1,936,861 | Nycum | Nov. 28, 1933 |
| 2,114,841 | Hanna | Apr. 19, 1938 |